(12) United States Patent
Kaiwa et al.

(10) Patent No.: US 6,204,631 B1
(45) Date of Patent: Mar. 20, 2001

(54) INTERCONNECTION STRUCTURE BETWEEN PORTABLE TELEPHONE AND BATTERY PACK

(75) Inventors: Ryoichi Kaiwa; Tetsuo Hirabayashi, both of Kanagawa (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 0 days.

(21) Appl. No.: 09/459,959

(22) Filed: Dec. 13, 1999

(30) Foreign Application Priority Data

Dec. 18, 1998 (JP) .................................................. 10-360741

(51) Int. Cl.$^7$ .................................................. H01M 10/46
(52) U.S. Cl. ........................................... 320/107; 320/112
(58) Field of Search .................................... 320/107, 112, 320/113, 114, 115

(56) References Cited

U.S. PATENT DOCUMENTS 5,317,247 * 5/1994 Chong et al. ........................ 320/112
5,786,106     7/1998 Aramani .

FOREIGN PATENT DOCUMENTS 2 309 819     8/1997 (GB) .

* cited by examiner

*Primary Examiner*—Edward H. Tso
(74) *Attorney, Agent, or Firm*—Pearne & Gordon LLP

(57) ABSTRACT

In a battery pack, pitfalls are provided at both end portions in the width direction of a rear surface lower portion of a portable phone main body. Projections higher than the electrode pins are provided at both ends in the width direction of a lower surface lower end portion of the battery pack at the position corresponding to the pitfalls. Grooves or a gap for guiding the projections are provided at both end portions in the width direction of the rear surface of the portable phone main body. In mounting the battery pack in the portable phone, the projections are contacted with the rear surface of the portable phone so that the battery pack slides to the lower side of the portable phone main body with the projections guided along the grooves gap. When the projections drop in the pitfalls after the tip of the battery pack passes above the pins, the pins are forced against the electrode of the battery pack according to the force of a biasing spring so as to be connected electrically in a conventional manner. The battery pack is fixed in position by fitting the upper end of the battery pack with a battery engaging portion of the portable phone.

2 Claims, 3 Drawing Sheets

*PRIOR ART*

INTERCONNECTION STRUCTURE BETWEEN PORTABLE TELEPHONE AND BATTERY PACK

BACKGROUND OF THE INVENTION

1. Field of the Invention

The present invention relates to a battery pack for a portable phone, more specifically, it relates to a battery pack to be mounted easily onto a portable phone.

2. Description of the Related Art

A detachable battery pack is used in a portable phone. In order to connect the battery pack and the phone electrically, contact pins to be contacted with an electrode of the battery pack are provided in the phone. The contact pins to be connected with the battery pack of the portable phone can move in the vertical direction owing to a spring, but cannot move in the lateral direction. Since the contact pins may break if a force is applied thereon in the lateral direction, the battery pack for the portable phone must be mounted onto the portable phone while avoiding the contact pins so as not to damage the pins due to the contact of the battery pack and the phone electrode pins.

FIGS. 3A and 3B show the state of mounting a conventional battery pack. FIG. 3A is a diagram showing the state of starting the installation of the battery pack. FIG. 3B is a diagram showing the state immediately before finishing the installation of the battery pack. As shown in FIG. 3A, the battery pack 1 is moved to the lower side (rightward in the figure) of a portable phone 9 (while sliding) with a tip portion 7 of the battery pack 1 supported by contacting with the lower part of the portable phone 9, and the lower side tip portion 8 of the battery pack 1 maintained at a position higher than pins 2. As shown in FIG. 3B, when the lower side tip portion 8 of the battery pack 1 contacts with the lower gap 10 of the portable phone 9, the battery pack 1 is inserted into the portable phone 9. Accordingly, by utilizing the height H of the lower gap 10, the battery pack 1 can be mounted in the portable phone 9 without contacting the lower side tip portion 8 of the battery pack 1 with the pins 2.

However, a problem is involved in that pins cannot be protected with the conventional configuration in the case of a portable phone that is so thin that a gap higher than the pins cannot be provided in the rear surface lower portion of the portable phone.

SUMMARY OF THE INVENTION

In order to solve the problem, an object of the invention is to enable easy installation a battery pack in a portable phone without damaging pins.

In order to achieve the object, the invention provides a battery pack comprising projections higher than electrode pins provided at both ends in the width direction of a lower surface lower end portion of the battery pack, corresponding to the position of pitfalls provided at both end portions in the width direction of a rear surface lower portion of the portable phone main body. According to the configuration, the battery pack can be mounted easily onto the portable phone without damaging the pins by maintaining the battery pack higher than the pins according to the projections.

Moreover, the projections are provided with a width capable of being guided slidably by gaps provided at both end portions in the width direction of the rear surface of the portable phone main body. According to the configuration, the projections can be guided to the right position so that the battery pack can be mounted easily onto the portable phone without damaging the pins.

Since a first aspect of the invention is a battery pack comprising projections higher than electrode pins provided at both ends in the width direction of a lower surface lower end portion of the battery pack, corresponding to the position of pitfalls provided at both end portions in the width direction of a rear surface lower portion of the portable phone main body, the effect of preventing damage of the pins by maintaining the height of the battery pack according to the projections can be achieved.

Since a second aspect of the invention is the battery pack of the first aspect, wherein the projections are provided with a width capable of being guided slidably by gaps provided at both end portions in the width direction of a rear surface of the portable phone main body, the effect of facilitating the installation of the battery pack by guiding the projections can be achieved.

DETAILED DESCRIPTION OF THE PREFERRED EMBODIMENT

Hereinafter an embodiment of the invention will be explained in detail with reference to FIGS. 1A to 2B.

An embodiment of the invention illustrates a battery pack comprising two projections higher than electrode pins provided in a lower surface lower end portion of the battery pack, corresponding to the position of pitfalls provided in a rear surface lower portion of the portable phone main body, wherein the width of the projections is the width of gaps provided in the rear surface of the portable phone main body.

Figure 1A:
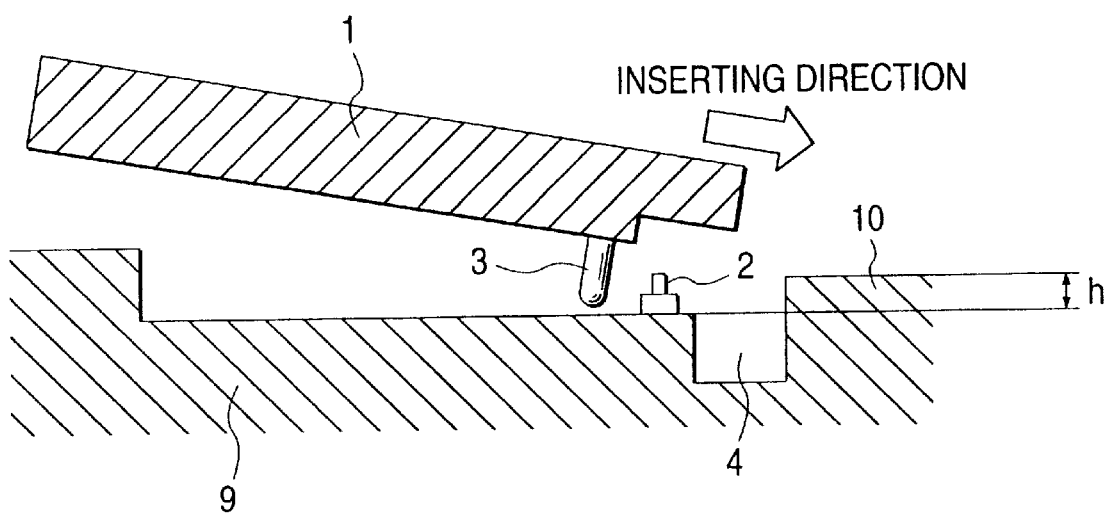
FIGS. 1A and 1B are diagrams showing the process of inserting a battery pack of an embodiment of the invention.
Figure 1B:
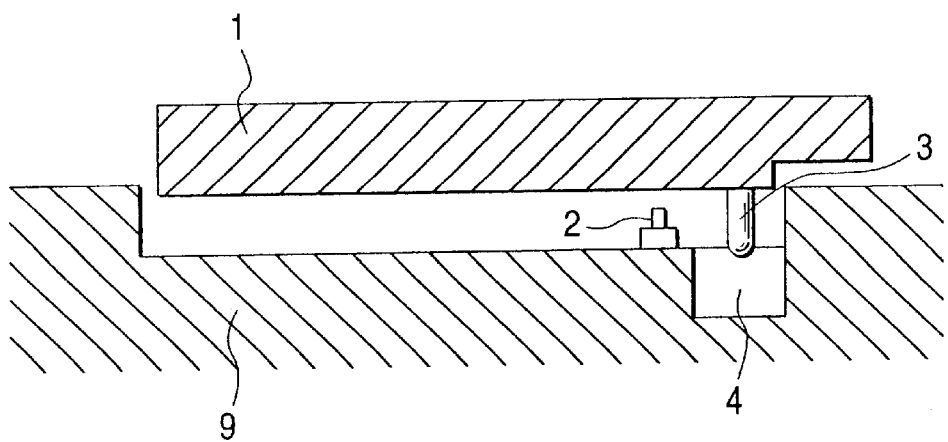

FIGS. 1A and 1B are diagrams showing the battery pack according to the embodiment of the invention. FIG. 1A is a diagram showing the process of starting the inserting operation of the battery pack. FIG. 1B is a diagram showing the dropping of the projections into the pitfalls. A battery pack 1 shown in FIGS. 1A and 1B is a battery pack to be mounted and used in a portable phone. Pins 2 are two electrodes provided in the center part of the portable phone for connecting the battery pack 1 and the portable phone, being biased by a spring. Projections 3 are provided in the vicinity of the ends in the width direction of the battery pack 1. Pitfalls 4 are holes provided in the vicinity of the ends in the width direction of the portable phone main body at the position corresponding to the projections 3 when the battery pack is fully mounted onto the phone.

Figure 2A:
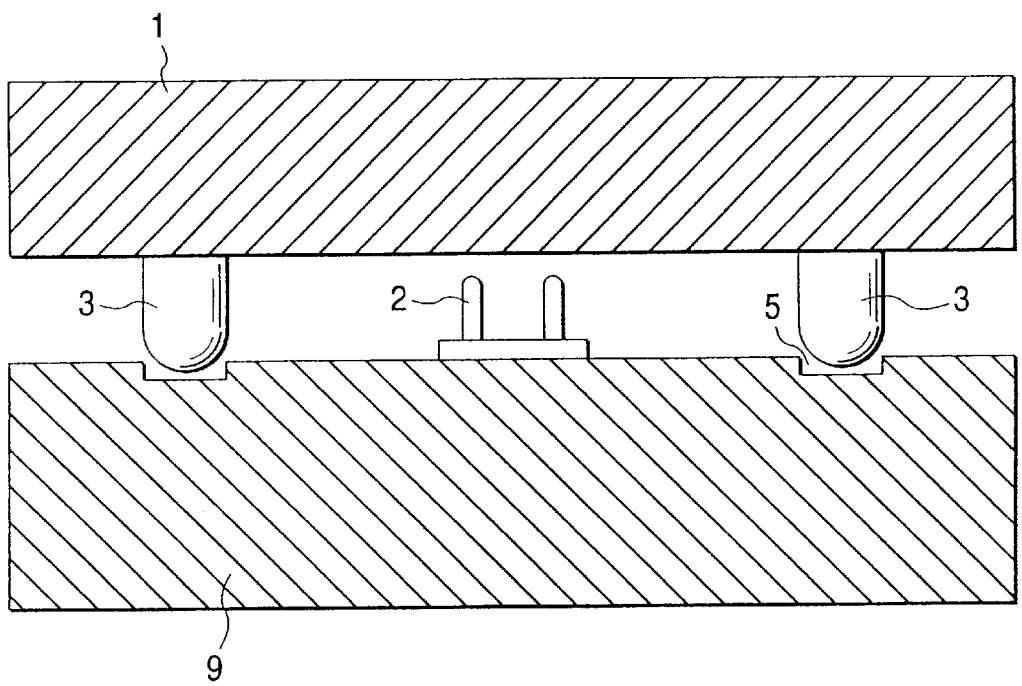
FIGS. 2A and 2B are cross-sectional views of the battery pack of the embodiment of the invention.
Figure 2B:
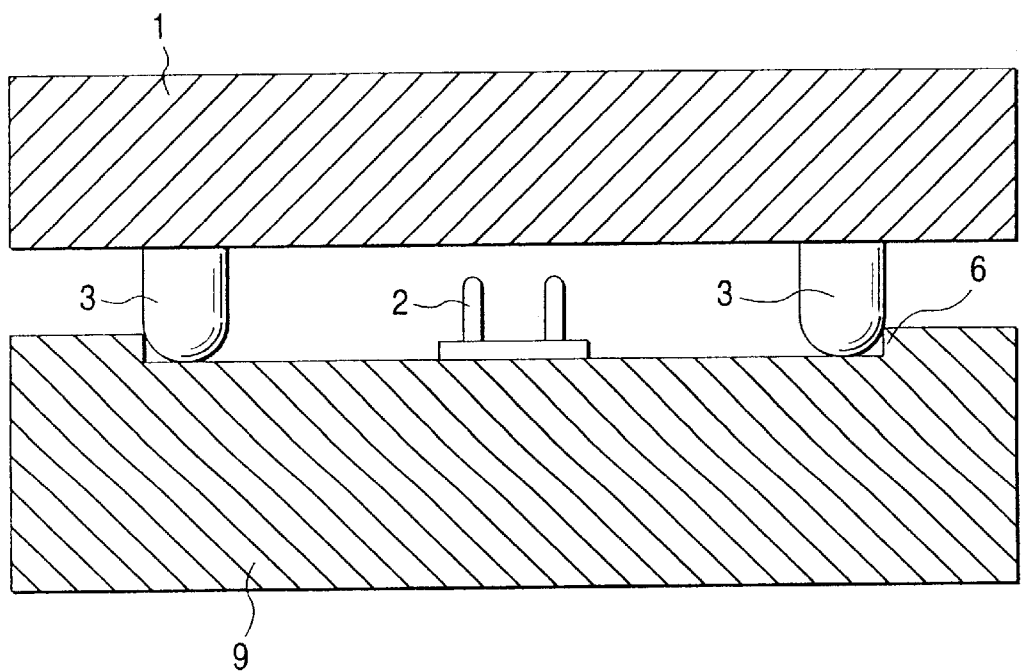
Figure 3A:
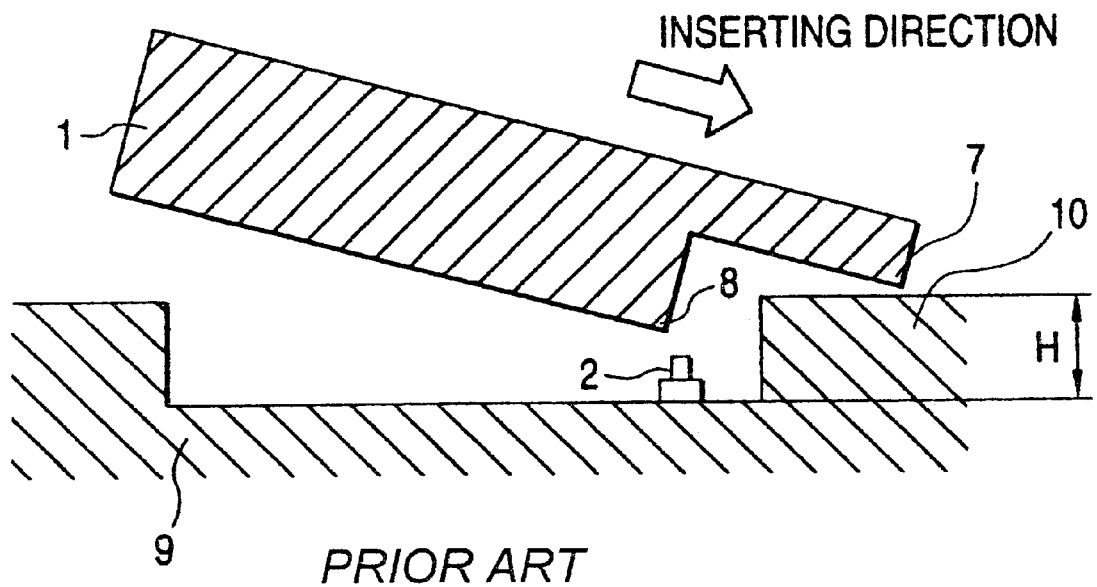
FIGS. 3A and 3B are prior art diagrams showing the state of inserting a conventional battery pack.
Figure 3B:
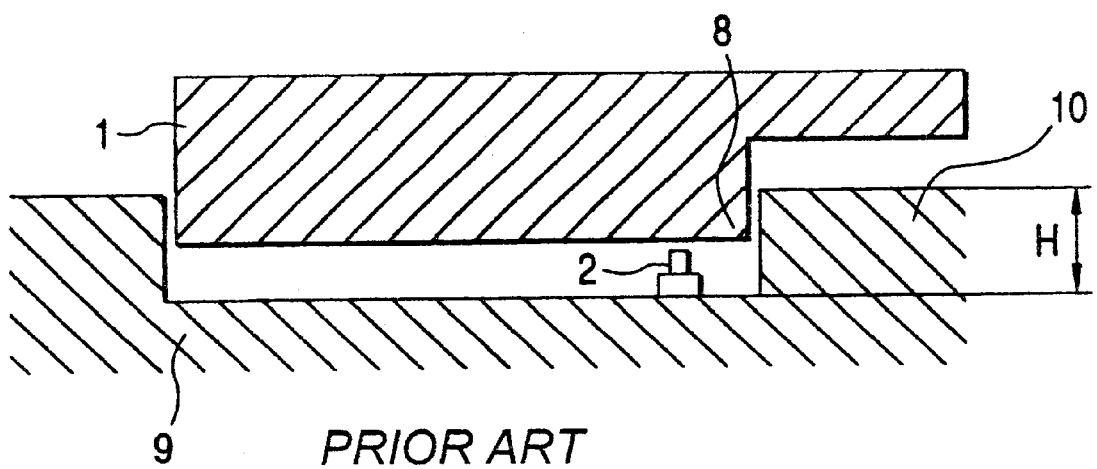

FIGS. 2A and 2B are cross-sectional views of the battery pack of the invention. In FIGS. 2A and 2B, grooves 5 are grooves for guiding the projections 3. Gap 6 is a gap for guiding the projections 3.

The function of the battery pack according to the embodiment of the invention with the above-mentioned configuration will be explained.

In mounting the battery pack 1 on the portable phone 9, the projections 3 provided on the lower surface of the battery pack 1 are contacted with the rear surface of the portable phone 9. As shown in FIGS. 2A and 2B, the rear surface of the portable phone 9 is provided with the grooves 5 or the gap 6 for guiding the projections 3 in the vicinity of the ends in the width direction. The battery pack 1 can slide to the lower side of the portable phone 9 with the projections 3 guided along the grooves 5 or within the gap 6. Since the projections 3 are higher than the pins 2, the tip of the battery pack 1 cannot come in contact with the pins 2. When the projections 3 come to the position of the pitfalls 4 (FIGS. 1A, 1B) after the tip of the battery pack 1 passes above the pins 2, the projections 3 drop into the pitfalls 4. In this state, the pins 2 are at the position corresponding to (i.e. aligned with) the electrode of the battery pack 1. The battery pack 1 is then fixed in position by fitting the upper end of the battery pack 1 with a battery engaging portion of the portable phone 9. The pins 2 are forced against the electrode of the battery pack 1 according to the force of a conventional biasing spring so as to be connected electrically as is well known in the art.

In the case the projections 3 are provided extremely close to the rims or edges of the battery pack, the projections 3 may be detached from the main body so that the lower portion tip end of the battery pack 1 may damage the pins 2, it is preferable that the projections 3 are provided in the vicinity of the center between the pins 2 and the end portions. Since the projections 3 may damage the pins 2 if they are provided in the vicinity of the pins 2, it is preferable that the projections 3 are provided as far as possible from the pins 2.

As mentioned above, since the invention is a battery pack comprising projections higher than electrode pins provided in the vicinity of the ends in the width direction of a lower surface lower end portion of the battery pack, corresponding to the position of pitfalls provided in the vicinity of the ends in the width direction of a rear surface lower portion of the portable phone main body, wherein the projections are provided with a width capable of being guided slidably by grooves or a gap provided in the vicinity of the rims in the width direction of the rear surface of the portable phone main body, the battery pack can be mounted in the portable phone easily without damaging the pins.

As heretofore mentioned, since the invention is a battery pack comprising projections higher than electrode pins provided at both ends in the width direction of a lower surface lower end portion of the battery pack, corresponding to the position of pitfalls provided at both end portions in the width direction of a rear surface lower portion of the portable phone main body, the mounting of the battery pack in the portable phone without damaging the pins can be achieved.

Moreover, since the projections are provided with a width capable of being guided slidably by grooves or a gap provided at both end portions in the width direction of the rear surface of the portable phone main body, the effect of mounting the battery pack in the portable phone easily can be achieved.

What is claimed is:

1. A battery pack comprising two projections greater in length than related phone electrode pins provided by and projecting from a rear surface of a portable phone main body, said two projections extending from a lower surface lower end portion of the battery pack, corresponding to the position of pitfalls provided in a rear surface lower portion of the portable phone main body.

2. The battery pack according to claim 1, wherein the projections are provided with a width capable of being guided slidably by grooves or a gap provided in the vicinity of the rims or edges in the width direction of the rear surface of the portable phone main body.

* * * * *